(12) United States Patent
Nusser

(10) Patent No.: US 7,101,101 B2
(45) Date of Patent: *Sep. 5, 2006

(54) INPUT APPARATUS FOR PEOPLE HAVING SMALL HANDS

(76) Inventor: Dennis W Nusser, 512 Victoria Ter., Ft. Lauderdale, FL (US) 33301

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 1643 days.

(21) Appl. No.: 08/612,969

(22) PCT Filed: Aug. 31, 1994

(86) PCT No.: PCT/US94/09827

§ 371 (c)(1),
(2), (4) Date: Mar. 4, 1996

(87) PCT Pub. No.: WO95/07186

PCT Pub. Date: Mar. 16, 1995

(65) Prior Publication Data

US 2003/0099496 A1    May 29, 2003

Related U.S. Application Data

(63) Continuation-in-part of application No. 08/378,946, filed on Jan. 26, 1995, now Pat. No. 5,531,529, which is a continuation of application No. 08/117,418, filed on Sep. 7, 1993, now abandoned.

(51) Int. Cl.
*B41J 5/12* (2006.01)
(52) U.S. Cl. ..................... 400/472; 400/682
(58) Field of Classification Search ................ 400/472, 400/682, 481, 485–489; 341/22, 21; 340/365; 361/680
See application file for complete search history.

(56) References Cited

U.S. PATENT DOCUMENTS

| | | | | | |
|---|---|---|---|---|---|
| 4,324,976 | A | * | 4/1982 | Lapeyre | 235/145 R |
| 4,669,903 | A | * | 6/1987 | Herzog et al. | 400/489 |
| 4,698,618 | A | * | 10/1987 | Liuzzo et al. | 340/365 |
| 4,823,294 | A | * | 4/1989 | Rouhani | 364/709.12 |
| 5,143,462 | A | * | 9/1992 | Klauber | 400/486 |
| 5,334,976 | A | * | 8/1994 | Wang | 341/22 |
| 5,452,960 | A | * | 9/1995 | Kuhlenschmidt | 400/487 |
| 5,531,529 | A | * | 7/1996 | Nusser | 400/472 |

* cited by examiner

Primary Examiner—Anthony H. Nguyen
(74) Attorney, Agent, or Firm—Kilpatrick Stockton LLP

(57) ABSTRACT

Input apparatus scaled for non-adult humans and adult humans having small hands. The input apparatus are especially well suited for use as computer keyboards for use by schoolchildren. Also disclosed is a computing system including the input apparatus.

24 Claims, 3 Drawing Sheets

INPUT APPARATUS FOR PEOPLE HAVING SMALL HANDS

This application is a continuation-in-part of U.S. patent application Ser. No. 08/378,946, filed Jan. 26, 1995, now U.S. Pat. No. 5,531,529 which is a continuation of U.S. patent application Ser. No. 08/117,418, filed Sep. 7, 1993, now abandoned.

BACKGROUND

1. Field of the Invention

This invention relates to input apparatus, such as a keyboard, which can be used for computer, typewriter, and other similar applications. It is particularly useful where the user is a non-adult (child) or an adult with smaller than adult-sized hands. The input apparatus of the present invention provides fixed keys with a key spacing, smaller than the ANSI/HFS 100-1988 standard spacing, which advantageously permits children as young as 3 and 4 years old to use the input apparatus utilizing standard touch typing techniques. Thus, the present invention relates to input apparatus and a method for using them and more particularly to a keyboard input device that is scaled to the size of the hands of non-adults (children) and adults having small hands.

2. Description of Prior Art

Previous input apparatus such as computer keyboards and typewriters utilize a specific key spacing and character layout that have evolved into standards. Character refers to the character generated by the computer, typewriter or other machine, upon receiving a signal that a particular key has been depressed or otherwise engaged.

The original "qwerty" key arrangement is the current accepted standard for keyboard character locations. A standard english language "qwerty" keyboard has three rows comprising alphabetic characters and punctuation marks. The remaining rows include numbers and a space bar. A return key, shift keys, a tab key and other command type keys may be included at the ends of each row.

Generally input apparatus such as computer keyboards have the following "qwerty" arrangement with individual rows and columns of keys offset with respect to one another:

| ` | 1 | 2 | 3 | 4 | 5 | 6 | 7 | 8 | 9 | 0 | - | = | del |
|---|---|---|---|---|---|---|---|---|---|---|---|---|---|
| tab | q | w | e | r | t | y | u | i | o | p | [ | ] | \ |
| cap | a | s | d | f | g | h | j | k | l | ; | ' | return | |
| shift | z | x | c | v | b | n | m | , | . | / | shift | | |
| con | opt | alt | | | space bar | | | | | alt | opt | con | | cap = caps lock; con = control; alt = alt; opt = optional

Holding down the shift key will add the following alphanumeric characters and punctuation marks:

| ~ | ! | @ | # | $ | % | ^ | & | * | ( | ) | _ | | del |
|---|---|---|---|---|---|---|---|---|---|---|---|---|---|
| tab | Q | W | E | R | T | Y | U | I | O | P | { | } | \| |
| cap | A | S | D | F | G | H | J | K | L | : | " | return | |
| shift | Z | X | C | V | B | N | M | < | > | ? | shift | | |
| con | opt | alt | | | space bar | | | | | alt | opt | con | | cap = caps lock; con = control; alt = alt; opt = optional

Function keys, arrow keys, and/or a separate numeric keypad may be added on the top and or side of this layout. In addition, different computer manufacturers may include additional keys for controlling the operation of their particular computers.

In addition to the "qwerty" keyboard layout, other letter layouts such as the Dvorak keyboard have been developed. As will be recognized by the those of ordinary skill in the art from the following descriptions of the present invention, the present invention may comprise any character key layout, such as the qwerty character layout, the Dvorak character layout and the like. Moreover, the present invention may be utilized with character layouts other than the standard English language characters. Thus, it should be understood that the present invention is not limited to a particular arrangement of characters corresponding to each key.

Keyboard standards as to key size and spacing were published Feb. 4, 1988 as American National Standards Institute (ANSI)/Human Factors Society (HFS) Standard No. 100-1988 (hereinafter the "ANSI/HFS 100-1988 standard"). The purpose of this standard is stated as: "This is a technical standard that specifies conditions that have been established as representing acceptable implementation of human factors engineering principles and practices in the design of visual display terminals (VDTs), associated furniture, and the office environment in which they are placed. Human factors engineering principles and practices are highly application dependent. This technical standard is written for those VDT applications described as text processing, data entry, and data inquiry."

The key spacing described in the ANSI/HFS 100-1988 standard is that the center line distance between the horizontal keys shall be between 18 and 19 mm and the center line distance between the vertical keys shall be between 18 and 21 mm. Center line distance is described in the ANSI/HFS 100-1988 standard. Vertical center line distance is the distance between two parallel lines, the first line horizontally bisecting a first key and the second line horizontally bisecting a second adjacent key above or below the first key. Similarly, horizontal center line distance is the distance between two parallel lines, the first line vertically bisecting a first key and the second line vertically bisecting a second adjacent key to the left or right side of the first key. Horizontal and vertical center line distances may be further understood in view of the following discussions and with reference to the appended figures.

Historically in the art the various inventions of input apparatus are based upon the ANSI/HFS 100-1988 standard which is a result of the evolution of the various input apparatus. It is seen that these various input apparatus are attached to various machines such as typewriters and computers. Historically the input apparatus were designed for the use by adult humans. The training of an individual in the use of these various input apparatus began at the high school level. These high school users were typically 16 years old or older. At this age their hand lengths fall in the 5th percentile of an adult male's hands, meaning they are then suited to using the devices currently provided. The 5th percentile is a size that results from surveying a group of adult males and calculating the frequency in which various sizes occur. The 5th percentile is a number that one would expect 5% of adult males to resemble, on the shorter end of the scale. For example, the 5th percentile of adult males in one study had a hand length of 17.8 cm. The 95th percentile in this study had a hand length of 20.5 cm.

With the advent of the microcomputer there have been an increasing number of children and other than adult scale humans that use various input apparatus. It would be desirable to have an input apparatus which would accommodate their physical sizes, especially their hands in relation to the input apparatus. These users currently in some instances cannot perform routine keystrokes on their input apparatus due to the size and spacing of the keys. For example, a simple, often utilized, command such as control-alternate-delete cannot be easily performed by users with small scaled hands using the devices currently provided.

SUMMARY OF THE INVENTION

The present invention overcomes the aforementioned disadvantages and provides input apparatus such as keyboards, that are sized to fit the smaller than adult-dimensioned hands. This invention fills the ergonomic and anthropometric needs of nonadult students by providing input apparatus scaled to the size of the user's hands.

Studying the hand lengths of youths aged 4 through 16 and comparing these lengths with the 50th percentile lengths of an adult male indicates that at age 4 the children's hands are 61% of the adult, at age six 67.4%, at age eight 74.5% through age sixteen, 93%. These ranges indicate the needs for input devices of varying size.

Accordingly, an embodiment of the input apparatus of the present invention comprises a plurality of keys, sufficient for providing a plurality of input signals to a central processing unit, with a key size and key spacing, centerline to centerline, between 60 and 86% of the ANSI/HFS 100-1988 standard key spacing. This percentage range of the ANSI/HFS 100-1988 standard results in this embodiment of the input apparatus of the present invention having a vertical key spacing of 10.8 to 18.0 millimeters and a horizontal key spacing of 10.8 to 16.4 millimeters. As will be recognized by those of ordinary skill in the art, generally key spacing dictates key size since key spacing is based on centerline distance.

The input apparatus of the present invention may include a plurality of keys sufficient for generating input signals corresponding to each letter of the alphabet. As will be recognized by those of ordinary skill in the art, the generation of input signals corresponding to each letter of the alphabet may be achieved by using a single key for each letter, or, if less than 26 keys are desired, by having a combination of keys which generate a particular letter when engaged together. The individual rows and columns of keys may be offset in order to facilitate the ability of the user of the input apparatus to reach each key. As used herein "offset" refers to the generally utilized method for arranging keys such as disclosed by the ANSI/HFS 100-1988 standard.

Thus, in one embodiment, the input apparatus of the present invention comprises at least 26 keys corresponding to the 26 letters of the english alphabet. For different language alphabets it may be desirable to use a greater or smaller number of keys.

Preferably, the input apparatus of the present invention includes a plurality of keys sufficient for generating input signals corresponding to each letter of the alphabet, and each arabic numeral. Thus, in a preferable embodiment the input apparatus of the present invention comprises at least 36 keys corresponding to the 26 letters of the english alphabet and the ten arabic numerals. Additional, keys may be provided for inputting functions, such as the control and tab keys, found on generally utilized keyboards. Further keys may also be provided for inputting functions such as "home", "page up", "delete", "end", "page down", "up", "down", "left", "right" etc. Still further keys, generally referred to in the art as "function keys" may be included to generate input signals corresponding to particular functions assigned to the key by the operating system or program utilized by the computer receiving input signals from the input apparatus. The input apparatus may also include a key, such as a "shift" key that when depressed in combination with other keys generates uppercase letters or the like. In this manner, the total number of keys utilized in the input apparatus can be minimized if desired.

More preferably, the input apparatus of the present invention comprises at least 58 keys arranged in the standard "qwerty" arrangement described above, and with different functions depending on whether a "shift" key is depressed in combination with another key. This more preferred arrangement may additionally include a plurality of function keys located above or to the side of the alphanumeric keys, and/or function keys, arrow keys and a numeric keypad to the side, or above, the alphanumeric keys.

In one more preferred embodiment, the input apparatus of the present invention comprises at least 58 keys arranged in a manner similar to the following layout, and with the key spacing described above: (the rows and columns would be offset with respect to each other as described above and as shown in the appended figures)

| esc | F1 | F2 | F3 | F4 | F5 | F6 | F7 | F8 | F9 | F10 | F11 | F12 | | | | | |
|---|---|---|---|---|---|---|---|---|---|---|---|---|---|---|---|---|---|
| ` | 1 | 2 | 3 | 4 | 5 | 6 | 7 | 8 | 9 | 0 | - | = | de | c | = | / | * |
| ta | Q | W | E | R | T | Y | U | I | O | P | [ | ] | \ | 7 | 8 | 9 | - |
| ca | A | S | D | F | G | H | J | K | L | ; | ' | ret | | 4 | 5 | 6 | + |
| shift | Z | X | C | V | B | N | M | , | . | / | shift | | | 1 | 2 | 3 | en |
| cont | | al | | space bar | | | | | al | | cont | | | 0 | | . | |

F1 - F12 = function keys; esc = escape key; de = delete key;
c = clear key; ta = tab key; ca = caps lock key;
cont = control key; al = alt key Additional arrow keys (for input cursor control signals) and function keys may be located between the alphabet keys and the numeric keypad. Input apparatus designed for use in environments where a language other than English is utilized would have alphanumeric keys appropriate for the desired language.

As will be recognized by those in the art, it may be desirable to separate the function keys and/or numeric keypad, from the alphanumeric and punctuation keys by including areas on the surface of the input apparatus that do not contain keys.

The prior art addresses the application of input apparatus for adults with normal adult male hand sizes in the adult work environment. My invention is the first to suggest a fixed size input apparatus designed specifically for children, and others with smaller than adult scale hands, that are currently being accommodated with the existing prior art.

The ergonomic and anthropometric advantages to my invention apparently are not obvious to those skilled in the art since the input apparatus known as a fixed key computer keyboard exists only in the scale intended for useage by adults with normal adult male hand sizes. The same applies to typewriter keyboards and other input apparatus. The invention of microcomputers resulted in the introduction of adult sized input apparatus to children and users with smaller than normal adult male hands.

Touch typing is now being taught in the third grade of elementary schools. Input apparatus, such as those of the present invention, designed for the scale of these and other non-adult students, and users, are beneficial in allowing the users to be properly accommodated and therefore increase learning ability and keyboard proficiency. It is preferred that the input apparatus of the present invention include sufficient keys to enable input signals to be generated corresponding to each letter of the English language alphabet utilizing standard touch typing techniques. Thus, the present invention also includes a method for teaching touch typing to humans with smaller than normal adult male hands utilizing standard techniques wherein the improvement comprises utilizing an input apparatus with the horizontal and vertical key spacing of the present invention.

In addition to the foregoing advantages, the use of a properly proportioned keyboard by children, and others with smaller than adult scale hands, will help these users avoid potential repetitive strain problems that might arise from using an improperly sized input apparatus.

The invention may be utilized in conjunction with a computing system comprised of a central processing unit, a visual display terminal, and a keyboard. This system can be comprised of separate elements or all elements within the same enclosure.

DETAILED DESCRIPTION OF THE INVENTION

Figure 1:
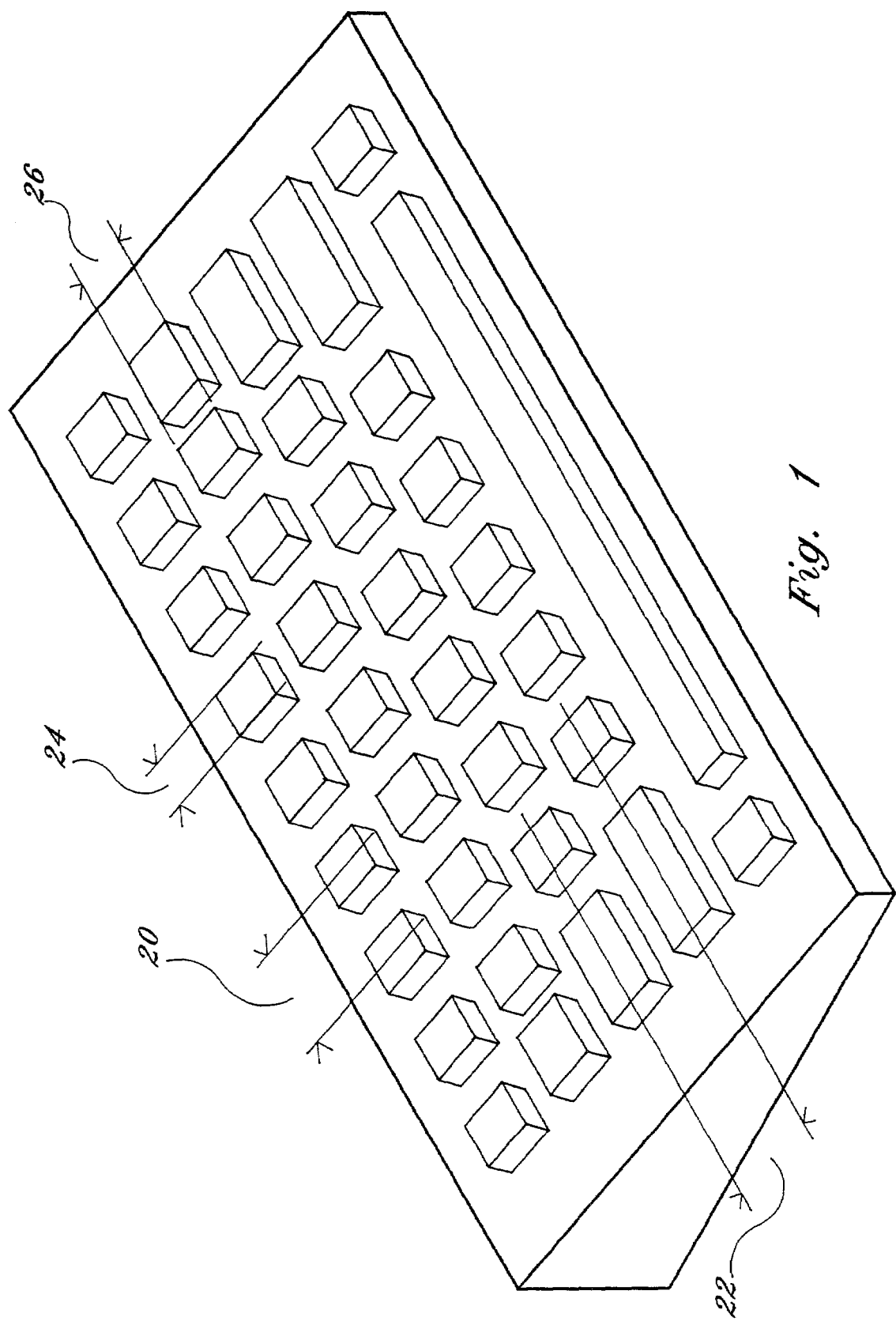
FIG. 1 shows a view of a fixed key input apparatus.
Figure 2:
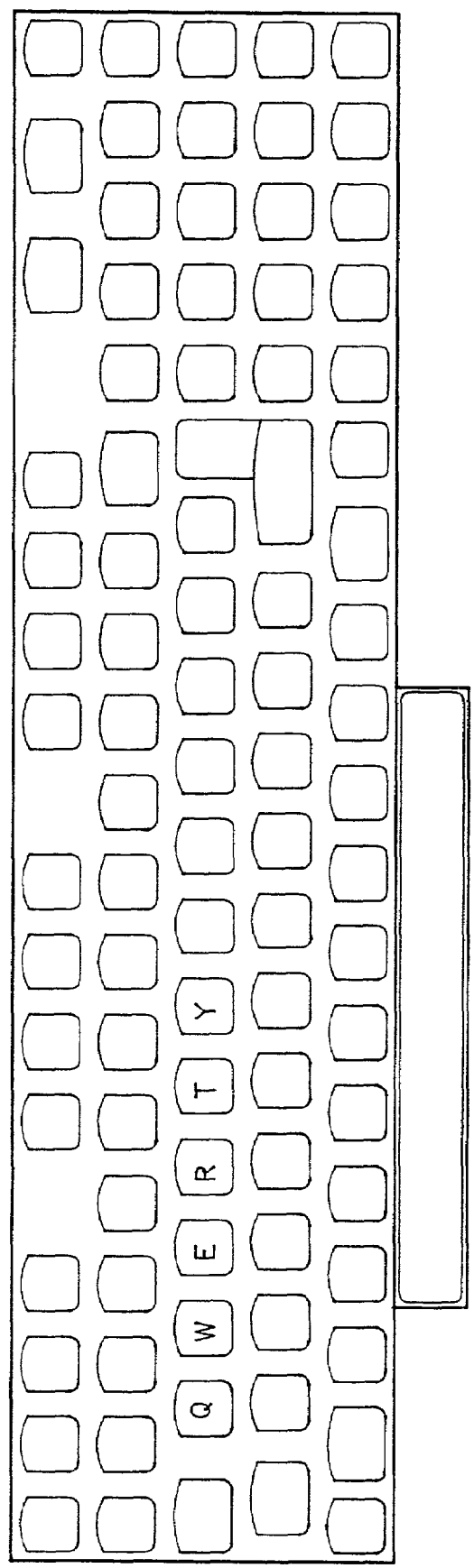
FIG. 2 shows an example of a fixed key input apparatus of the present invention.
Figure 3:
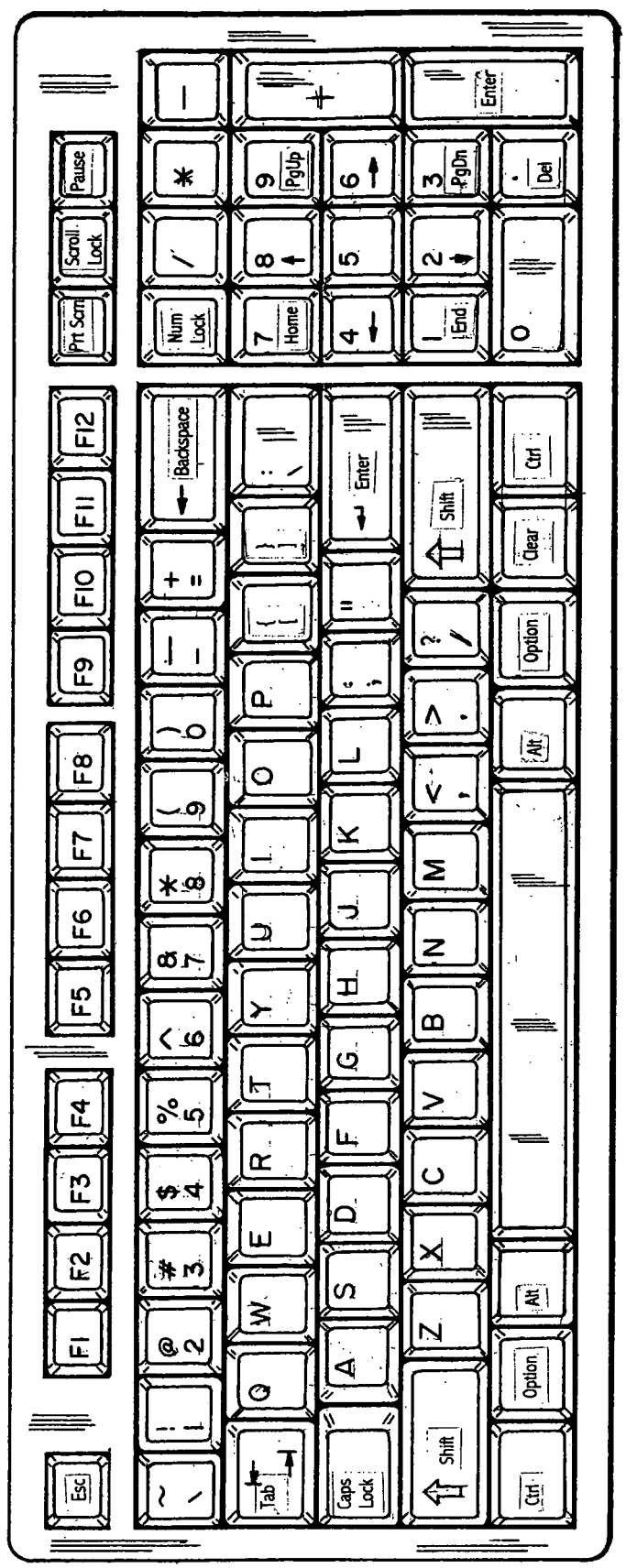
FIG. 3 shows an embodiment of a layout for a fixed key input apparatus of the present invention.

An embodiment of the present invention is shown in FIG. 1. With reference to FIG. 1, the centerline horizontal distance of the keys is 20. 20 can be 10.8 mm to 16.4 mm (0.425 inch and 0.646 inch). Preferable distances are 12.0 mm, 13.5 mm, and 14.5 mm for three different sizes based upon age and hand length. Other preferable distances are 12.75 mm and 14.15 mm for two different sizes based upon age and hand length.

The centerline vertical distance of the keys is 22. 22 can be 10.8 mm to 18.0 mm (0.425 inch and 0.711 inch). Preferable distances are 12.7 mm., 14.3 mm, and 15.6 mm for three different sizes based upon age and hand length. Other preferable distances are 13.45 mm and 14.9 mm for two different sizes based upon age and hand length.

Spacing for three different sizes is 65%, 73%, and 80% of the average spacing size used in the art, generally the ANSI/HFS 100-1988 standard. Spacing for two different sizes is 69% and 76.5% of the average spacing size used in the art (the ANSI/HFS 100-1988 standard).

The width of an individual key surface is 24. 24 can be 7.2 mm to 13 mm. Preferable distances are those that correspond to the percentage range selected for 20 and 22. Thus, preferable key surface widths are 7.8 mm, 8.76 mm and 9.6 mm (65%, 73% and 80% of the ANSI/HFS 100-1988 standard). Additional preferable key surface widths are 8.28 mm and 9.28 mm (69% and 76.5% of the ANSI/HFS 100-1988 standard).

The depth of an individual key surface is 26. 26 can be 7.2 mm to 15 mm. Preferable distances are those that match the range selected for 20 and 22. Thus, preferable key surface depths are 9.3 mm, 10.44 mm and 11.44 mm (65%, 73% and 80% of a conventional keyboard). Additional preferable key surface depths are 9.87 mm and 10.94 mm (69% and 76.5% of the ANSI/HFS 100-1988 standard).

As will be seen in the art, most input apparatus can include keys sized differently than 24 and 26, including function keys, keypad keys, space bars, numeric keypads and the like. In the input apparatus of the present invention, such keys, if present, will be ergonomically sized and spaced in a manner similar to the standard alphanumeric input keys. Thus, function keys, keypad keys, space bars, numeric keypads and the like would be located at a spacing generally corresponding to 60 to 86% of the ANSI/HFS 100-1988 standard. Preferably these keys would be located at a spacing from the alphanumeric keys corresponding to 65%, 73% and 80% of the ANSI/HFS 100-1988 standard. Additional preferable spacing would locate these keys at a spacing from the alphanumeric keys corresponding to 69% and 76.5% of the ANSI/HFS 100-1988 standard.

As will be recognized by those of skill in the art, other key spacing and key sizes within the ranges and other keyboard configurations fall within the scope of the present invention. As will be obvious to those skilled in the art the present invention may be applied to typewriters and input apparatus other than those designed for use with a computer.

The keyboard may be produced by any technology known to the art such as the technology disclosed in U.S. Pat. Nos. 5,067,834, 5,122,786, 4,669,903 and 4,661,005, the disclosures of which are hereby incorporated by reference, and other conventional technologies known to those skilled in the art. As will be obvious to those skilled in the art the present invention may be constructed as a keyboard comprised of the individual keys connecting to an electric or electronic matrix with a source of current allowing inputting electrical signals to a computer or other device.

The ANSI/HFS 100-1988 standard regarding other aspects of the keyboard, such as key force, keying feedback and keystroke travel may be utilized. For example, the conventional keystroke travel set forth in the ANSI/HFS 100-1988 standard, i.e 1.5–6 mm, preferably 2–4 mm. This keystroke travel distance can be used but it is preferred that the same 60% to 86% reduction used for key spacing also be used for keystroke travel. Thus the preferred keystroke travel distance for the input apparatus of the present invention is 1.2–3.44 mm. With different input apparatus sizes available the user can progress from small to larger with growth.

While the above description contains many specificities, the reader should not, construe these as limitation on the scope of the invention, but merely as exemplifications of preferred embodiments thereof. Those skilled in the art will envision many other possible variations within its scope. For example, skilled artisans have developed other keyboard types to address ergonomic needs of keyboard users by dividing the keyboard in half, changing the angle of the keys, etc. This invention is equally applicable to other adult-sized input apparatus in the art.

An embodiment of the input apparatus of the present invention is described in the following example:

EXAMPLE

A keyboard with the keys arranged in the manner known in the art as the "qwerty" key arrangement embodying in addition a row of 12 function keys arrayed horizontally directly above the horizontal numeric keys, a "10-key" keypad located to the right of the "qwerty" layout, cursor control keys, and various other keys as used in the art of a computer keyboard, the size and space of which is 73% of the keyboard described in the ANSI/HFS 100-1988 standard. The overall footprint of the keyboard is 36 cm wide by 15 cm in depth. The horizonal centerline key spacing, 20, is 13.5 mm. The vertical centerline key spacing, 22, is 14.235 mm. The key tops are, 24, 9 mm wide and, 26, 10 mm deep. The other keys are similarly scaled. The keyboard utilizes present art to provide a current response to the depression of each key or a combination of keys that is utilized by a central processing unit of a microcomputer, allowing the computer to display the information on a visual display unit.

The invention claimed is:

1. A fixed key input apparatus comprising a plurality of keys to generate input signals corresponding to each letter of an alphabet wherein the keys are arranged with a horizontal key spacing, centerline to centerline, of 10.8 to 16.4 millimeters, a vertical key spacing, centerline to centerline, of 10.8 to 18.0 millimeters, an individual key width of 7.2 to 13 millimeters, an individual key depth of 7.2 to 15 millimeters, and the keystroke travel range of said keys is about 0.9 to 6 millimeters, whereby the fixed key input apparatus is sized accordingly for use by a person with smaller than average hands.

2. The input apparatus of claim 1 wherein the alphabet is English and the input apparatus comprises a key for each letter of the alphabet.

3. The input apparatus of claim 1 further comprising keys to generate input signals corresponding to a plurality of numerals.

4. The input apparatus of claim 3 wherein the numerals are arabic numerals and the input apparatus comprises a key for each number 0 to 9.

5. The input apparatus of claim 1 further comprising a key or keys for generating signals corresponding to a function to be undertaken.

6. The input apparatus of claim 5 wherein the function to be undertaken comprises:
shift, return, control, alt, tab, caps lock, home, end, page up, page down, clear, scroll lock, up, down, left, right, backspace, delete, number lock (num lock), enter, print screen, pause, escape (esc), option, or combinations thereof.

7. The input apparatus of claim 2 wherein the individual keys are arranged in a qwerty layout.

8. The input apparatus of claim 2 further comprising keys to generate input signals corresponding to a plurality of numerals.

9. The input apparatus of claim 8 wherein the numerals are arabic numerals and the input apparatus comprises a key for each number 0 to 9.

10. The input apparatus of claim 8 further comprising a key or keys for generating signals corresponding to a function to be undertaken.

11. The input apparatus of claim 9 further comprising a key or keys for generating signals corresponding to a function to be undertaken.

12. The input apparatus of claim 10 wherein the function to be undertaken comprises: shift, return, control, alt, tab, caps lock, home, end, page up, page down, clear, scroll lock, up, down, left, right, backspace, delete, number lock (num lock), enter, print screen, scroll lock, pause, escape (esc), option, or combinations thereof.

13. The input apparatus of claim 1 further comprising a key or keys for generating input signals corresponding to a symbol.

14. The input apparatus of claim 3 further comprising a key or keys for generating input signals corresponding to a symbol.

15. The input apparatus of claim 8 further comprising a key or keys for generating input signals corresponding to a symbol.

16. The input apparatus of claim 15 wherein the symbol comprises: ', ~, !, @, #, $, %, ^, &, *, (, ), _, -, +, =, \, |, ], }, {, [, :, ;, ", ', ", ', <, ,, >, ., ?, or /.

17. The input apparatus of claim 16 wherein the alphabetic keys are arranged in a qwerty layout.

18. The input apparatus of claim 1 wherein the keystroke travel range of said keys is 2 to 4 millimeters.

19. The input apparatus of claim 18 wherein the keystroke travel range of said keys is 1.2 to 3.44 millimeters.

20. An ergonomic input apparatus comprising a plurality of keys, said plurality:
   generating input signals corresponding to each letter of the English alphabet;
   generating input signals corresponding to each arabic numeral 0 to 9;
   generating input signals corresponding to a function to be undertaken wherein said function comprises: shift, return, control, alt, tab, caps lock, home, end, page up, page down, clear, scroll lock, up, down, left, right, backspace, delete, number lock (num lock), enter, print screen, pause, escape (esc), option, or combinations thereof; and generating input signals corresponding to symbols wherein said symbols comprise: ', ~, !, @, #, $, %, ^, &, *, (, ), _, -, +, =, \, |, ], }, {, [, :, ;, ", ', ", ', <, ,, >, ., ?, or /;
   wherein said keys generating input signals corresponding to each letter of the English alphabet are arranged in an array having a horizontal key spacing, centerline to centerline, between adjacent keys, of 10.8 to 16.4 millimeters, a vertical key spacing, centerline to centerline, between adjacent keys of 10.8 to 18.0 millimeters, an individual key width of 7.2 to 13 millimeters, an individual key depth of 7.2 to 15 millimeters and
   wherein the keystroke travel range of said keys is about 0.9 to 6 millimeters;
   whereby the fixed key input apparatus is sized accordingly for use by a person with smaller than average hands.

21. The ergonomic input apparatus of claim 20 wherein the alphabetic keys are arranged in a qwerty layout.

22. The ergonomic input apparatus of claim 20 further comprising a plurality of function keys identified with the legend "F#" wherein # is an arabic numeral.

23. The ergonomic input apparatus of claim 21 wherein the keystroke travel range of said keys is 1.2 to 3.44 millimeters.

24. The input apparatus of claim 2 wherein the individual keys are arranged in a "Dvorak" layout.

* * * * *

UNITED STATES PATENT AND TRADEMARK OFFICE
CERTIFICATE OF CORRECTION

PATENT NO. : 7,101,101 B2
APPLICATION NO. : 08/612969
DATED : September 5, 2006
INVENTOR(S) : Dennis W. Nusser It is certified that error appears in the above-identified patent and that said Letters Patent is hereby corrected as shown below:

Under "BACKGROUND"

Column 3 Line 3 the phrase "the use by adult humans" should read--use by adult humans--

Column 5 Line 48, delete the comma "," between the words "students" and "users" --students and users--

Column 6 Line 44 delete the period"." between "mm" and "," --are 12.7 mm,--

Signed and Sealed this

Third Day of April, 2007

JON W. DUDAS
*Director of the United States Patent and Trademark Office*